(12) United States Patent  (10) Patent No.: US 8,768,897 B2
Artishdad et al.  (45) Date of Patent: Jul. 1, 2014

(54) METHOD FOR PRODUCING AND MANAGING A LARGE-VOLUME LONG-TERM ARCHIVE

(75) Inventors: Jerry Artishdad, Karben (DE); Christian Hett, Niddatal (DE)

(73) Assignee: Artec Computer GmbH, Karben (DE)

( * ) Notice: Subject to any disclaimer, the term of this patent is extended or adjusted under 35 U.S.C. 154(b) by 0 days.

(21) Appl. No.: 13/577,778

(22) PCT Filed: Mar. 10, 2011

(86) PCT No.: PCT/EP2011/053637
§ 371 (c)(1),
(2), (4) Date: Aug. 31, 2012

(87) PCT Pub. No.: WO2011/110639
PCT Pub. Date: Sep. 15, 2011

(65) Prior Publication Data
US 2012/0330905 A1 Dec. 27, 2012

(30) Foreign Application Priority Data
Mar. 12, 2010 (DE) .......................... 10 2010 011 344

(51) Int. Cl.
*G06F 17/00* (2006.01)

(52) U.S. Cl.
USPC .......................................................... 707/692

(58) Field of Classification Search
None
See application file for complete search history.

(56) References Cited

U.S. PATENT DOCUMENTS

2006/0041533 A1* 2/2006 Koyfman ........................... 707/3
2007/0050333 A1* 3/2007 Vogler .............................. 707/3
2008/0282355 A1* 11/2008 Nemazi et al. .................. 726/26
2008/0301134 A1* 12/2008 Miller et al. ...................... 707/6
2010/0088277 A1* 4/2010 Rao et al. ..................... 707/637

OTHER PUBLICATIONS

MIME Overview by Mark Grand, http://mgrand.home.mindspring.com/mime.html, Oct. 26, 1993.*

* cited by examiner

*Primary Examiner* — Robert Beausoliel, Jr.
*Assistant Examiner* — Hau H Hoang
(74) *Attorney, Agent, or Firm* — Andrew Wilford

(57) ABSTRACT

The present invention relates to a method for producing and managing a large-volume long-term archive which comprises an archive data memory and a management file, and to a corresponding long-term archive. The method according to the invention involves relocating archive data in a container file so that the legal validity of the data is maintained by virtue of qualified signing.

16 Claims, 1 Drawing Sheet

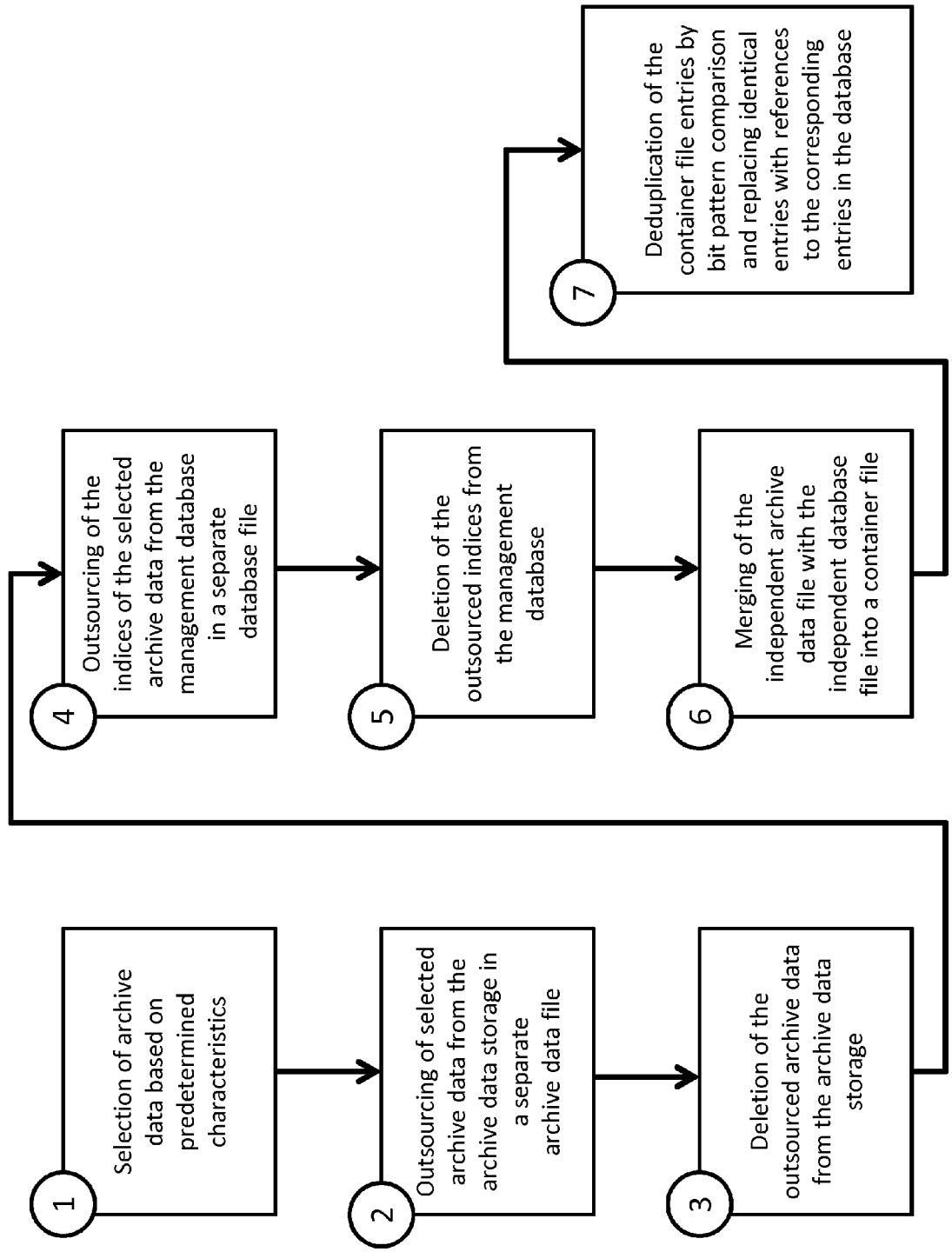

METHOD FOR PRODUCING AND MANAGING A LARGE-VOLUME LONG-TERM ARCHIVE

CROSS REFERENCE TO RELATED APPLICATIONS

This application is the US-national stage of PCT application PCT/EP2011/053637 filed 10 Mar. 2011, published 15 Sep. 2011 as WO2011/110639, and claiming the priority of German patent application 102010011344.1 itself filed 12 Mar. 2010.

FIELD OF THE INVENTION

The invention relates to a method of producing and managing a large-volume archive that is composed of an archive data storage medium and a management file. The method according to the invention involves relocating archive data in a container file so that the legal validity of the data is maintained by providing them with a qualified electronic signature.

BACKGROUND OF THE INVENTION

As the "paperless office" has moved forward and produced a frequently occurring situation whereby documents are no longer available or no longer exclusively available in printed form but are in the form of electronic data, for which documents a legal retention period of 30 years or longer applies in the business and even in the private sphere, an ever-increasing need has arisen for the ability to provide legally secure archiving of the accumulating data. The problems of long-term storage of have grown along with the exponential growth of electronic information, despite the fact that software technologies are fundamentally better suited for managing information than is possible by traditional means with paper and file folders. Since documents in electronic form can be easily modified, measures must be taken to ensure that the archived data remain in their original state. Electronic signatures enable electronic documents to obtain the same legal character as manually signed documents.

Legislators have attached strict requirements to the fact that such documents must constitute court-admissible evidence. German legislators have implemented directive 1999/93/EC ("Electronic Signature Directive") of the European Union, which governs the use of electronic signatures, through the Electronic Signature Act (SigG) and the Electronic Signature Ordinance (SigV). These state that an electronic document provided with a qualified electronic signature has the same status as it does in written form. The qualified electronic signature to the greatest extend possible has the same legal validity as the handwritten signature. As a result, documents signed in this way, such as for example e-mails or electronic invoices, can be used as evidence in court in the same way as their counterparts on paper. When files are archived, the signature files can either be stored separately from the original file or attached to this file.

Electronic long-term archiving refers to preservation of electronic information over a period longer than ten years. To this end, archive systems have been developed that are composed of databases, archive software, and storage systems. These systems are based on the approach whereby a reference database including the management and indexing criteria links to an external storage medium to which the data are relocated. This enables a large quantity of information to be relocated to separate archive storage media.

Conventional electronic archives entail the disadvantage, however, that search procedures have been provided in extremely cumbersome form for finding individual archive data or filtering the data according to special criteria, specially whenever a very large quantity of (small) archive data is involved. In addition, these archive data can eventually occupy a large amount of storage space, with the result that it is desirable to reduce storage space while maintaining a qualified electronic signature so that the documents can continue to function as court-admissible evidence. In addition, it is advantageous if the data can be reconstituted with bit-level precision when they are reconstructed.

OBJECT OF THE INVENTION

The technical object of the present invention is therefore to provide a method of producing and managing a large-volume archive that allows for a reduction in the storage space requirement and non-modifiability of the data, thereby enabling these to be reconstructed with bit-level precision. A further goal is to provide the ability to search a large quantity of data based on predetermined parameters in the fastest time possible.

SUMMARY OF THE INVENTION

The object is achieved by the method according to the invention for managing a large-volume long-term archive that is composed of an archive data storage medium and a management database. The archive data here are collected in a container file in which the non-modifiability of these data is ensured. It is thus no longer possible to delete or modify individual files, and the qualified electronic signature of the respective files is preserved. A deduplication mechanism enables multiple existing files to be recognized and tied together by links such that the data can be reconstructed with bit-level precision. Indices provide a fast search function within the container data. As a result, it is also possible to manage efficiently large-volume archives assembled from a plurality of individual files.

BRIEF DESCRIPTION OF THE DRAWING

The drawing is a block diagram illustrating the principal steps of the method of this invention.

DETAILED DESCRIPTION

Details of the method according to the invention are as follows: The archive data are first selected based on predetermined traits. These selected archive data are subsequently relocated from the archive data storage medium to a separate archive data file and then deleted from the archive data storage medium. In addition, the indices of the selected archive data are relocated from the management database to a separate database and then deleted from the management database. Following this, the separate archive data file is combined with the separate database file in a container file. In the next step, the entries in the container file are deduplicated by comparing the bit patterns of the entries and replacing identical patterns with links to the corresponding entries in the database.

A variation of the described method can also be advantageous whereby the relocated data are not deleted immediately from the archive data storage medium but are instead first relocated after selection to one or more additional container files based on additional traits whereby the new selections can both be subsets of the first selection as well as include new archive data, and all relocated archive data are deleted only upon completion of all relocation operations. This enables multiple container files to be created for specific subject areas that are composed of overlapping data sets, such as, for example, all data relating to a birth year or a department, and all data for a specific employee.

If the need still arises to incorporate certain relocated archive data in even more containers after the relocated archive data have been deleted from the archive data storage medium, it is necessary to again re-import the data from the container to the active archive data storage medium. It is therefore advantageous for the management functions of the archive solution to also include a corresponding function for re-importing individual datasets from containers.

There may also be a requirement for example that certain data about this employee must be deleted after a give time period when an employee leaves. However, this is not easily implemented in the relocated container files. To do this, the entire container containing the relevant data must be re-imported to the archive data storage medium. The data in question can then be deleted and the remainder of the imported data relocated back to a container. This is preferably effected by means of a separate management function of the archive solution. It is also conceivable, however, to have this specific deletion task performed by separate software without re-importation to the normal archive data storage medium. This would keep the data archive from being overloaded, and the deletion operation could be performed more quickly in a temporary archive. This would furthermore eliminate the need to select the remaining data before the new relocation to a container file. What is of course then required is that the supplemental software have the same keys as the management software of the archive data storage medium in order to be able to decrypt and re-encrypt the container data. From the standpoint of security technology, the first-referenced deletion method is preferred.

Whenever the archive data involve e-mails including MIME (Multipurpose Internet Mail Extensions)-encoded attachments, repeatedly existing attachments are deduplicated in such a way that the MIME encoding can be reconstructed with bit-level precision. When an e-mail is processed, it is possible for the bit pattern of, for example, a base64 encoding to be modified due to the fact that space characters, line breaks, or entire blank lines are inserted or removed, whereby the encoded file is nevertheless not changed since the base64-encoded content can be wrapped in any arbitrary manner. In order to ensure, despite the completed deduplication and storage, that this original e-mail can be reconstructed with bit-level precision in the more easily compressible binary format that requires less storage space by a factor of 4/3, the encoding is inspected line by line for deviations from the standard form, and the line length is stored and the reconstruction information for each deduplicated attachment is stored.

This method of deduplication for archiving including the ability to effect reconstruction of attachments with bit-level precision can also be used according to the invention for archiving without the use of container files, and contributes in a very fundamental way to the conformity of the archive in accordance with the requirements of the Electronic Signature Act or the Electronic Signature Ordinance. As a result, the method is also consistently applied in the method with container files since here too the object of the invention consists in improving the conformity of the archive with the legal requirements in addition to relieving the load on the e-mail and archive server.

In the case of prior decoding of the file attachments, the original file attachments are in fact reassigned to the individual e-mails when read from the archive after deduplication and are also re-attached in the corresponding encoding—however, the reconstructed e-mails will nevertheless not automatically match the originally archived e-mail with bit-level precision since deviations from the standard form of encoding cannot be taken into account. The method according to the invention, however, takes these deviations into account and provides reconstruction of the original e-mail with bit-level precision. In addition, the method according to the invention retains all headers of the file attachments as well as all additional intermediate lines and separator lines with bit-level precision, and also does not modify the encoding of the file attachments, for example between Quoted Printable and base64. Only base64-encoded attachments are stored in the container so as to enable reconstruction of the original document with bit-level precision by storing the line length as well as each deviation from the normal form together with the link to the file attachment. As a result, the method, unlike the other methods, also conforms with the requirements of the Electronic Signature Act or the Electronic Signature Ordinance that tie the usability in court of the stored e-mail to its verifiable originality and thus reconstruction with bit-level precision. In addition, the described method is technically advantageous since the method of reconstructing e-mails relocated to the container is independent of processing the e-mail outside the archive system.

The advantage of combining the archive files in a container file consists in the fact that the containers provide an appropriate platform for deduplication, a factor that entails a significantly lower cost of deduplication than does live data. Furthermore, these files relieve the load on the archive and the database, thereby providing improved performance for the system. Finally, the data cannot be later modified or deleted from the container. This ensures that the integrity of the data is preserved. All of the data can thus relocated to individual container in accordance with the requirements. Already existing qualified and advanced signatures, as well as optional advanced and/or qualified time stamps for each document, can also be packed together with each document. These then continue to attest to the non-modifiability of every stored file. The individual containers are detached from the existing archive and stored individually. Storage can be effected here on various storage media, such as, for example, external data media that can be kept at another location for as long as these are not needed. For example, files can thus be completely relocated that come from a specific time period such as a calendar year in order to save storage space. Each container here has separate index that accelerates search and sorting based on specific fields, with the result that specific data can be accessed in a targeted fashion.

Another major advantage is achieved by reducing the requisite storage capacity. The ability to reduce storage space exists due to the fact that the index cannot subsequently be changed. This is effected through an intelligent deduplication mechanism in which individual documents are analyzed on a bit-by-bit basis. Whenever an identical bit pattern is recognized, this is stored in the database and replaced with an entry in the document. When e-mails, for example, are relocated in a container file, this may involve a very large volume of small files that have to be managed. Whenever e-mails are processed, the block composition of the bit pattern can change, with the result that a blank line is inserted. This is detected by the deduplication mechanism and the files can be assigned unambiguously.

The method according to the invention thus enables a large-volume archive to be produced and efficiently managed. This method furthermore meets the requirements of the Electronic Signature Act and the Electronic Signature Ordinance, as well as the requirements of the U.S. according to which certain data may deleted only after three or six years.

The following procedure is advantageously employed to effect deduplication of the container contents. With e-mails, in particular, the attachments are removed from the e-mails or referenced (utilizing the base64 normal form) in a first step. The file attachments are at the same time stored in the space-saving binary format. In principle, it would later be possible to compare every file attachment against every other file attachment—however, this would entail an exponential increase in computing time. The rump e-mails and bodies are then relocated; the remaining ones, in particular, the relevant large attachments, are subsequently separated.

The above measures alone yield the following advantages:
Identical e-mails/documents have already been deduplicated on the e-mail level and the document level.
Duplicated attachments are stored only once.
Base64 has an overhead of 4/3 (3 bytes are stored in 4 characters is plus a line break at approximately every 76 characters, that is, 2 bytes for the break). The is eliminated by storing attachments in binary form.

Although base64 can be readily compressed with ZIP/LZMA, etc. by this 4/3 amount, the underlying binary file can be much better compressed as a binary file than in base64 form since each repeatable portion can appear at four different offsets.

Additional optional steps can include delta-encoding the attachments for every other one, that is, only storing a delta. An example of this type of delta implementation and a standardized file format (VCDIFF) is found in RFC 3284 that specifies storing a file as a delta for an existing file (found on the Internet, for example at http://www.faqs.org/rfcs/rfc3284.html). Since this kind of operation would necessitate a tremendous time cost, the attachments are advantageously sorted based on appropriate criteria and only a sliding window of, for example, ten attachments are compared against each other. The following discussion describes the advantageous individual steps of the method in more detail.

It can be especially advantageous if the entries are first sorted by file name in order to deduplicate entries in the container file, and the successive entries are then examined for differences. This makes it possible to combine files having probably similar contents and to restrict the deduplication to a specific subrange. It is of course then possible that some duplicates will not be captured. However, this is compensated by a considerable performance advantage in terms of deduplication. A method of this type is especially recommended for document management systems that generate corresponding content-related file names.

In an especially advantageous embodiment, deduplication of the entries is effected by sorting the entries first by file type (file extension) and then by file name, and possibly also by information relating to the original folder. The successive entries are then examined for differences such that the smallest differences between entries are stored at the same time in compressed form. In terms of additional information, a hash value for a subrange of the information—for example, the subject line of an e-mail or the recipient—can be computed and used as the sorting criterion. The entries are then sorted in a final step in descending order by size since deltas that remove information are smaller and a larger portion remains in the original anchor of the delta compression, that is, in the original document, which due to its size will contain multiple redundancies and in overall terms can thus be more effectively compressed.

Another advantageous variant for deduplicating entries in the container file is to sort the entries first by means of a similarity search and then to examine the successive entries for differences. The rest of the method and the advantages achieved match those of the above-referenced sorting method, where with sorting based on a similarity search the probability is higher for capturing a more comprehensive portion of the duplicates, however, the sorting cost to do this is also greater. One possible approach for the similarity search is provided by the method described in the publication "Optimizing File Replication over Limited-Bandwidth is Networks using Remote Differential Compression" by Dan Teodosiu, Nikolaj Bjørner, Yuri Gurevich, Mark Manasse, and Joe Porkka (available on the Internet at http://research.microsoft.com/en-us/um/people/gurevich/Opera/183.pdf), which method is based on subdividing the files to be compared into very small pieces, creating hash values for these pieces, and comparing the hash values obtained. Whenever matches are found here, the contents of the files will also be similar.

In an advantageous embodiment of method according to the invention, the generated container file is protected by providing them with a signature against modifications. The use of a qualified electronic signature provides even better protection of the container against unauthorized access. The number of required time stamps is reduced due to the fact that only a qualified stamp needs to be applied to the entire container. Since the Electronic Signature Act and the Electronic Signature Ordinance impose minimum security-technical standards for data processing centers that issue qualified electronic signatures, and appropriate providers are approved only after careful examination, the providers of qualified electronic signatures only do this as fee-based service. Every qualified electronic signature obtained thus represents a cost factor. This amounts to economically relevant costs if, for example, all of the e-mails of a company need to be archived.

In another advantageous embodiment of the method according to the invention, the container files can be enabled or disabled for the management and search functions as subunits under the main database, and/or they can be managed and used as separate archives. Each container can then be turned on or off individually. The administrator can thereby decide which data will also be available later, and when and how. If required, the container file can thus be stored on an external storage medium or made available to certain persons in a network. It is also possible to set up a rights system that can precisely define which person(s) can access which containers.

In another advantageous embodiment of the method according to the invention, an index is additionally created for the full-text search within the relocated archive data and stored in the container file. An entry is made in the index that includes the precise position in the dataset for each word, except for fill words (definite and indefinite articles, prepositions, conjunctions) that tend to be useless in terms of searching. An effective search function then enables fast searching of large sets of data in the container. In addition to any otherwise used SQL (Structured Query Language) query that presupposes knowledge of the field structure, field-independent searching is also possible. Any complex search queries can thus be made on the database, and, for example, all files containing specific keywords can be filtered out.

One problem, on the other hand, is that it is possible to reconstruct content from the obtained full-text index. It is desirable for this reason to encrypt this index, and possibly the entire container as well. Therefore in another advantageous embodiment of the method according to the invention, the index for the full-text search in the container file and/or the container files can be encrypted by means of a cryptographic algorithm. Known cryptographic algorithms include asymmetric encryption algorithms, such as for example the RSA algorithm, methods based on elliptical curves, or symmetric encryption methods, such as for example encryption methods using the DES (Data Encryption Standard) or AES (Advanced Encryption Standard). This further encryption of the data enables additional access protection to be ensured, with the result that only authorized persons are able to view the data.

The method of managing a large-volume long-term archive can be applied to all types of files. Conceivable archives include: archives for e-mails that can be automatically recorded in the archive when received or sent out, file archives that can function as a backup solution and at the same time document the various processing states of the files (for example, voice recordings, image recordings, video recordings), document archives that constitute an electronic filing system composed of created text and/or image documents and that can also create document files, for example, from data sent to a printer in addition to the document files. In addition, fax archives or document archives from scanned paper copies are possible.

The invention claimed is:

1. A method of producing and managing a large-volume archive that is composed of an archive data storage medium and a management database, the method comprising the steps of:
  selecting archive data based on predetermined traits;
  relocating the selected archive data from the archive data storage medium to a separate archive data file;
  deleting the relocated archive data from the archive data storage medium;
  relocating indices for the selected archive data from the management database to a separate database;
  deleting the relocated indices from the management database;
  combining the separate archive data file with the separate database file in a container file;
  deduplicating entries in the container file by effecting a bit pattern comparison of entries, and replacing identical patterns with links to the corresponding entries in the database; and
  whenever the archive data involve e-mails having base-64 MIME-encoded attachments, deduplicating these multiple attachments in such a way the MIME encoding is reconstructible for each attachment with bit-level precision by
  examining the encoding line by line for deviations from a normal form,
  storing the line length, and
  storing the reconstruction information for each deduplicated attachment.

2. The method according to claim 1, wherein the relocated archive data are not deleted immediately from the archive data storage medium, but are first relocated after selection based on additional traits to one or more additional container files, the new selections comprising subsets of the first selection and new archive data, and all relocated archive data are deleted from the archive data storage medium only upon completion of all relocation operations.

3. The method according to claim 1, further comprising the steps of:
  first sorting the entries by file name and
  thereafter examining successive entries for differences in order to deduplicate entries in the container file.

4. The method according to claim 1, wherein, to deduplicate entries in the container file, the entries are first sorted by a similarity search and successive entries are then examined for differences in order.

5. The method according to claim 1, further comprising the step of:
  protecting one or more relocated selected archive data against modifications by providing them with an electronic signature.

6. The method according to claim 1, further comprising the step of:
  protecting one or more relocated selected archive data against modifications by providing them with a qualified electronic signature.

7. The method according to claim 1, wherein the container files are protected against modifications by providing them with an electronic signature.

8. The method according to claim 1, wherein the container files are protected against modifications by providing them with a qualified electronic signature.

9. The method according to claim 1, further comprising the steps of:
  enabling and disabling the container files for the management and search functions as subunits under the main database, or managing and using the container files used as separate archives.

10. The method according to claim 1, further comprising the step of:
  creating an index for a full-text search within the relocated archive data and storing the index in the container file.

11. The method according to claim 1, further comprising the step of:
  encrypting the index for the full-text search in the container file or the container files by means of a cryptographic algorithm.

12. The method according to claim 1, wherein the archive data comprise e-mails, voice recordings, image recordings, video recordings, scanned documents, print files, or files.

13. The method according to claim 1, further comprising the step of:
  storing in the container file that includes the assignment of the user ID's for the e-mail addresses whenever the archive data relate to e-mails.

14. A method of relocating e-mails having base-64 MIME-encoded attachments in an archive, the method comprising the step of:
  selecting archive data based on predetermined traits;
  relocating the selected archive data from the archive data storage medium to a separate archive data file;
  deleting the relocated archive data from the archive data storage medium;
  relocating indices for the selected archive data from the management database to a separate database;
  deleting the relocated indices from the management database;
  combining the separate archive data file with the separate database file in a container file;
  deduplicating entries in the container file by effecting a bit pattern comparison of entries, and replacing identical patterns with links to the corresponding entries in the database; and
  deduplicating multiple existing attachments in such a way the MIME encoding can be reconstructed for each attachment with bit-level precision by examining the encoding line by line for deviations from a normal form,
storing the line length is stored, and
storing the reconstruction information for each deduplicated attachment.

15. The method according to claim 13, further comprising the steps of:
first sorting attachments by file name and thereafter
examining the successive entries for differences in order to deduplicate the base64 MIME-encoded attachments.

16. The method according to claim 14, further comprising the step of:
first sorting attachments by a similarity search and thereafter
examining the successive entries for differences in order to effect deduplication of the base64 MIME-encoded attachments.

* * * * *